United States Patent [19]

Griffin et al.

[11] Patent Number: 5,513,350
[45] Date of Patent: Apr. 30, 1996

[54] UPDATE CONSTRAINTS IN TRANSACTIONS WHICH MAY ABORT

[75] Inventors: Timothy G. Griffin, New Providence; Howard W. Trickey, Westfield, both of N.J.

[73] Assignee: AT&T Corp., Murray Hill, N.J.

[21] Appl. No.: 250,205

[22] Filed: May 27, 1994

[51] Int. Cl.$^6$ ................................ G06F 15/40; G06F 7/00
[52] U.S. Cl. ................... 395/600; 395/189.01; 395/650; 395/700; 395/182.13; 364/DIG. 1; 364/DIG. 2; 364/222.82; 364/962.1
[58] Field of Search .................................. 395/600, 425, 395/575, 700, 650

[56] References Cited

U.S. PATENT DOCUMENTS

| | | | |
|---|---|---|---|
| 4,933,848 | 6/1990 | Haderle et al. | 364/300 |
| 4,947,320 | 8/1990 | Crus et al. | 395/600 |
| 5,133,068 | 7/1992 | Crus et al. | 395/600 |
| 5,267,346 | 11/1993 | Maruyama et al. | 395/10 |
| 5,355,474 | 10/1994 | Thuraisngham et al. | 395/600 |
| 5,386,557 | 1/1995 | Boykin et al. | 395/600 |
| 5,408,657 | 4/1995 | Bigelow et al. | 395/600 |

FOREIGN PATENT DOCUMENTS

| | | | |
|---|---|---|---|
| 0351209 | 1/1990 | European Pat. Off. | G06F 15/40 |
| 0428264A2 | 5/1991 | European Pat. Off. | G06F 15/40 |

OTHER PUBLICATIONS

Marie Collins et al, "Security Constraint processing during the update operation in multijewel secure databare management system", IEEE, 1991, pp. 23–32.

Sang Ho Lee et al, "Enforcement of integrity comstraints against transactions with transaction Axions," IEEE, 1992, pp. 162–167.

Stephen Clarke et al, "Software fault trees and weakest preconditions: a comparasion and analysis", IEEE, 1993, pp. 225–236.

M. Samg Gamal-Eldino et al; "Local and Global Constraints in Database Entegration" IEEE, 1989, pp. 604–611.

Xiao Quan, "An Effective Method for Integrity Constraint Simplification" IEEE, 1988, pp. 338–345.

P. W. P. J. Grefen, "Combining Theory and Practice in Integrity Control: A Declarative Approach to the Specification of a Transaction Modification Subsystem", *Proceedings of the 19th VLDB Conference*, Dublin, Ireland, 1993, pp. 581–589.

M. Lawley, R. Topor, M. Wallace, "Using Weakest Preconditions to Simplify Integrity Constraint Checking", *Proceedings of the 4th Australian Database Conference*, Brisbane, Feb. 1–2, 1993, pp. 161–170.

P. W. P. J. Grefen, *Integrity Control in Relational Database Systems–An Overview–*, Nov. 1991, Chapters 1, 2 and 3.

X. Qian, et al., "Integrity Constraint Reformulation for Efficient Validation", *Proceedings of the 13th VLDB Conf.*, Brighton 1987, pp. 417–425.

Anonymous, "Distributed Optimistic Concurrency control Based on Time-Stamp History Certification", *IBM Technical Bulletin*, Apr. 1991, vol. 33, No. 11, pp. 178–181.

*Primary Examiner*—Thomas G. Black
*Assistant Examiner*—C. Pham
*Attorney, Agent, or Firm*—Gordon E. Nelson

[57] ABSTRACT

A technique which may be used in a transaction which updates a data set when the data set is subject to constraints and includes operations which may abort. The technique produces an update constraint which may be tested before the data set is altered to determine whether the constraints will be satisfied if the data set is altered. The update constraint of the technique indicates whether the constraints would be satisfied if the transaction could not abort. The update constraint is checked at the application level, while the constraints which cause an operation to abort are checked at the system level. An application of the update constraint to a relational data base embedded in a telephone switch is disclosed.

10 Claims, 2 Drawing Sheets

FIG. 3

Examples employees(name, salary, dept)

departments(dept, manager)

Constraints:

1. $\forall e \in employees$
   $min \leq e.salary \wedge e.salary \leq max$ } 303

2. $\forall e \in employees \; \exists d \in departments$
   $d.dept = e.dept$ } 305

3. $\forall d \in departments \; \exists e \in employees$
   $d.manager = e.name \wedge d.dept = e.dept$ } 307

4. $\forall e_1 \in employees \; \forall e_2 \in employees \; \forall d \in departments$
   $(d.dept = e_1.dept \wedge e_2.name = d.manager)$
   $\rightarrow e_1.salary \leq e_2.salary$ } 309

Example 1 input:

$hire(n, s, dp) = \underbrace{insert(employees, \langle n, s, dp \rangle)}_{503}$  403

501     505 output:

$hire(n, s, dp) =$
  if $min \leq s \wedge s \leq max \wedge$
    $(\exists d \in departments \; d.dept = dp) \wedge$
    $(\forall e \in employees \; \forall d \in departments$
      $(d.dept = dp \wedge d.manager = e.name)$
      $\rightarrow s \leq e.salary)$
  then $insert(employees, \langle n, s, dp \rangle)$
  else error 513      515 (407)      115      509      511

UPDATE CONSTRAINTS IN TRANSACTIONS WHICH MAY ABORT

1 BACKGROUND OF THE INVENTION

1.1 Field of the Invention

The invention concerns systems in general in which operation of the system is subject to constraints and particularly concerns constraints involved in maintaining the integrity of data in a data base system.

1.2 Description of the Prior Art

An important operation in data base systems is changing the data in the system. Operations which change data may involve adding data, deleting data, or updating data, which is a combination of deleting and adding. In the following, operations which change the data base are termed generally update operations.

Care must be taken in an update operation that the data being added to the data base system does not compromise the integrity of the data in the data base system. For example, a data base of employee information may have a record for each employee which includes fields specifying the employee's grade and pay. Pay may be coupled to the grade, so that it must be above a minimum and below a maximum specified for the grade. In such a data base, maintaining the integrity of the data base system requires that when a new employee record is added or an existing record is altered, the data base system check whether the pay in the new or altered record is within the range specified for the grade. A condition which must be met by data which is to be included in a data base in order to maintain the integrity of the data base is termed a constraint, and in many data base systems, any update operation includes a phase called constraint checking, in which the data base system determines whether the constraints required for the operation are satisfied.

One way of doing constraint checking is to do the operation, check any constraints, and if a constraint has been violated, undo the update. However, it is usually possible to determine whether the constraints will be violated before the update is made and do the update only if there is no violation.

Of course, constraint checking takes time, so it is important to do as little as possible of it. In many cases, constraints are dependent on other constraints in such a fashion that only a few of the constraints actually need to be checked. A smaller set of constraints which can be checked with the same results as checking all of the constraints is termed an update constraint. One way of finding an update constraint is to calculate a logical formula called the weakest precondition of the entire set of constraints with regard to the update. The weakest precondition sets forth a set of constraints which must be true if the entire set of constraints is to be true after the update has been performed. See C. A. R. Hoare, "An axiomatic basis for computer programming," in: *Communications of the ACM* 12(10), October 1969.

However, even testing the constraints of the weakest precondition may involve more work than necessary. As set forth in X. Qian, "An effective method for integrity constraint simplification", in: *Fourth International Conference on Data Engineering*, 1988, it is possible to take advantage of the fact that the constraints are known to hold in advance. Since that is the case, the weakest precondition can be factored into a first portion of the weakest precondition which is implied by the constraints and a second portion which is not. The AND of these portions is logically equivalent to the weakest pre-condition, and consequently, it possible to check the weakest precondition by checking the second portion only, and the second portion by itself can thus function as the update constraint.

A problem with the foregoing work on update constraints involving the weakest precondition and Qian's further simplification thereof is that it does not take into account the fact that in practical data base systems, certain of the data base system operations which are executed in the course of an update operation may themselves abort, that is, they may terminate without affecting the data base if certain constraints imposed by the data base system are not satisfied. For example, the data base system insert operation which actually inserts a new record into a data base requires that the new record be in fact new; it determines this by checking whether a key which identifies the record to the date base system is the same as that of any existing record in the data base; if it is, the insert operation aborts. The constraints which these operations must satisfy are different from those required to keep the content of the data consistent, and it has heretofore not been apparent how to incorporate such constraints into update constraints.

2 SUMMARY OF THE INVENTION

The inventors have discovered that all that is necessary to solve the problem of update constraints in systems which have operations which may abort is to determine the update constraint using the assumption that the transaction cannot abort. In one aspect of the invention, the discovery is used in methods and apparatus for generating code for transactions which incorporates update constraints determined as describe above. In another, such update constraints are used in methods and apparatus for performing update transactions. An advantage of such update constraints is that the checks for the constraints which cause the system to abort the operation are performed at the system level, while those for the update constraint are performed at the application level.

Other objects and advantages of the apparatus and methods disclosed herein will be apparent to those of ordinary skill in the art upon perusal of the following Drawing and Detailed Description, wherein:

3 BRIEF DESCRIPTION OF THE DRAWING

FIG. 3 shows constraints employed in the example;

FIG. 5 is an example of update code generated for the example.

Figure 1:
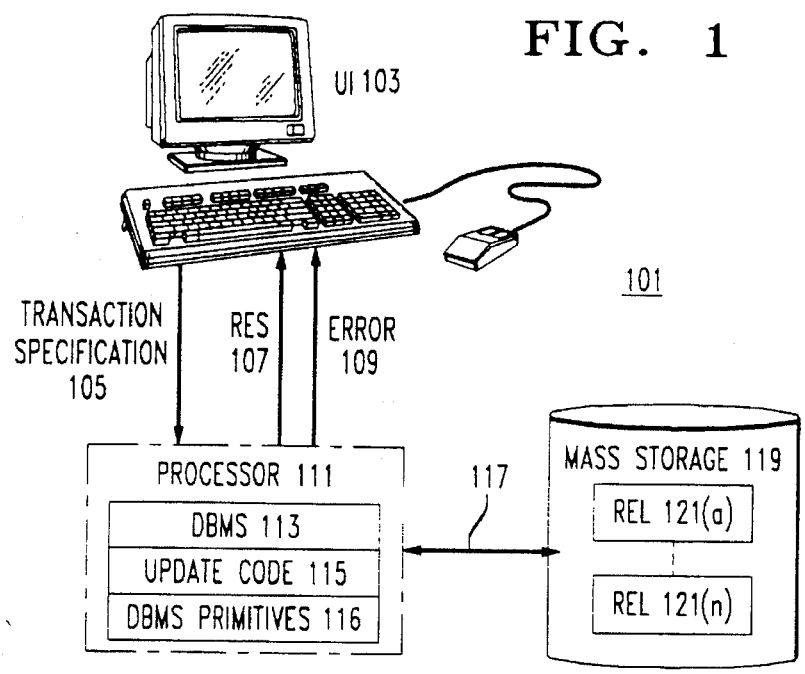
FIG. 1 is an overview of a data base system in which the invention may be employed.

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF A PREFERRED EMBODIMENT

The following discussion will begin with an example of the invention; thereupon, a precise logical definition of the invention will be presented.

4.1 Overview of a Data Base System: FIG. 1

FIG. 1 shows a typical data base system 101. The hardware components of system 101 are a processor 111 which can execute computer programs, mass storage device 119, on which data is stored, and user interface 103, which includes a display, a keyboard, and a pointing device such as a mouse.

System 101 results from the execution of the code for a data base management system 113 on processor 111. Data base management system 113 organizes the data in mass storage 119 into a set of relations. Each relation is a table which has columns and rows. The columns define classes of data (for example, employee name, employee department, and pay), while the rows contain related values of the data, for instance a specific employee name and the specific values for employee department and pay which go with that employee name. There are two kinds of relations in data base system 101: base relations 121, in which the data values are actually stored in mass storage 119, and views, that is, relations which do not really exist in mass storage 119 but are constructed on the fly from data in base relations 121.

Data base management system 113 manipulates the data in response to transaction specifications 105 which specify transactions on the data in the data base system. The transaction specifications are provided by users of the data base system. The transaction specifications, specify operations on the relations such as reading data from a relation or writing data to the relation. Data base management system 113 responds to a transaction specification 105 by invoking data base management system primitive routines 116 as needed to perform the operations 117 on mass storage device 119 required to execute the transaction; if the transaction succeeds, the result is returned to the user interface, as indicated by arrow 107; otherwise, an error message 109 is returned.

As pointed out in the Description of the Prior Art, one important class of operations specified by transaction specifiers is update operations, in which the data in relations 121(a) is altered. The part of data base management system 115 which performs update operations appears in FIG. 1 as update code 115. As also pointed out in the Description of the Prior Art, when a transaction involves an update of data in relations 121, data base management system 113 must ensure that the update does not degrade the integrity of data base system 101, and consequently, part of the task of update code 115 is to check whether update constraints have been violated. If they have been, update code 115 does not change the data in relations 121, but instead returns an error message 109. Transactions involving updates are termed in the following update transactions.

Figure 4:
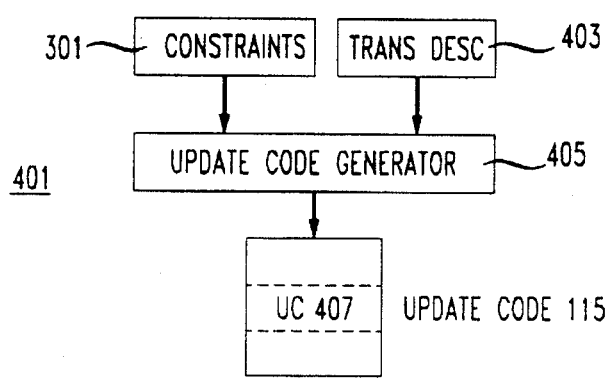
FIG. 4 is a block diagram of apparatus for generating update code according to the invention.

4.2 An Example Update Transaction: FIGS. 3–5

Figure 2:
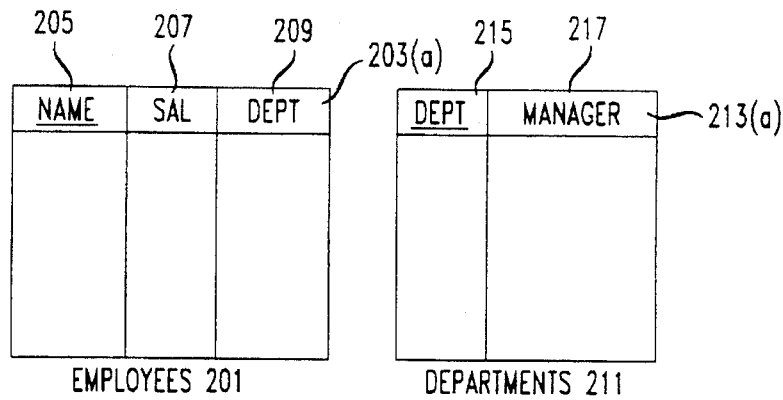
FIG. 2 shows two relations employed in an example.

In the following, a simple example will be presented to show how weakest preconditions may be used to do constraint checking in data base system 101. The example involves two relations 121. The relations are shown in FIG. 2. The first relation is employees relation 201, which has a row 203 for every employee. The columns of the relation are name 205, for which the values are employee names, sal 207, for which the values are employee salaries, and dept, for which the values are department numbers. Thus, each row 203 specifies an employee's name, his salary, and his department number. As indicated by the underline, the name field functions as the key for each record, that is, the record is identified to data base management system 113 by the value of name.

The second relation is departments 211, which has a row 213 for each department in the business. The columns are dept 215, whose value is the department number, and manager 217, whose value is the name of the manager. The key in departments 211 is dept 215. Departments 211 and employees 201 are related to each other by way of the keys. For example, the manager whose name appears in manager column 217 for a given row 213 of departments 211 also has an entry under his name in employees 201. Because the key of one relation is used as data in the other, the data base management system can construct views which contain information from both relation 211 and relation 201. One example of such a view is a relation which has an entry for each manager and which specifies the manager's name, department, and salary. In making the view, data base management system 113 retrieves the manager's name and department from departments 211 and uses the manager's name in employees 201 to retrieve the value of the manager's salary from column 207.

Even in the two relations 211 and 201, there are a number of constraints on the values of the rows. FIG. 3 shows these constraints 303, expressed in the notation of logic. Constraint 303 states that for all employees in relation 201, the salary must range between two values specified by rain and max. Constraint 305 specifics that for all employees, the department number in column 209 must be one of the department numbers in departments 211. Constraint 307 says that for every row in departments 211, there must be a row in employees 201 such that the value of manager equals the value of name and the value of dept in the row of employees 201 equals the value of the same field in the row of departments 211. Constraint 309, finally, says that for all employees $e_1$, all employees $e_2$, and all departments, if the two employees are in the same department and employee $e_2$ is the department manager, employee $e_1$'s pay must be less than or equal to employee $e_2$'s pay, or in other words, that no employee's pay may be higher than that of his manager.

Whenever an update operation is performed on relation 201, relation 211, or any on any view where the view is derived from relation 201 or 211 and the change involves a value of relation 201 or 211, a constraint check must be made to ensure that none of the constraints of FIG. 3 is violated. This constraint check is performed by update code 115. FIG. 4 shows how update code including the proper constraint check is generated. Constraints 301 and a transaction descriptor 403 which describes a class of transactions are input to update code generator 405, which generates update code 115 for the transaction described by descriptor 403. Update code 115 includes update constraints 407, which are checked whenever a transaction belonging to the class described by descriptor 403 is performed to make sure that the transaction is not violating one or more of the constraints 301.

FIG. 5 gives an example of how update code 115 is generated from constraints 301 and a transaction description 403. Transaction description 403 defines a class of hire transactions 501. In this transaction, done when a new employee is hired, a row 203 containing the new employee's name, salary, and department number is added to employees 201. The name of the new employee is represented in the transaction description by the parameter n, the salary by the parameter s, and the department number by the parameter dp. As indicated by the = symbol, the transaction description defines the hire transaction by equating it to a sequence of statements in a transaction language which describe the transaction.

In the example, only a single statement is required, namely an insert statement 503. Insert statement 503 specifies that a row 203 is to be inserted in employees 201, and that values are to be supplied for all three fields of the row. The order of the values corresponds to the order of the fields of the row. When update code generator 405 receives transaction description 403, it uses transaction description 403 and constraints 301 to generate update code 513. Update code 513 contains update constraint 515, which is an update constraint 407 which embodies the principles of the invention.

Inserting a row in employees 201 requires the use of the insert operation 509, one of the primitives 116 provided by data base management system 113. A property of insert operation 509 is that it aborts if the key of the row being added to the relation is the same as a key for a row which is already in the relation. Thus, if insert 503 is used to insert a row in relation 201 which has a value for n (representing the name) which is the same as a value for name field 205 in another record of employees 201, insert 509 will not alter employees 201.

In accordance with the principles of the invention, constraint 515 does not reflect the constraints which data base management system 113 requires for insert operation 509. Instead, update constraint 515 includes only those constraints which must be checked if insert operation 509 does not abort. Thus, none of the constraints in update constraint 515 deal with the relationship of the key 205 of the new row 203 to the keys 205 of the other rows 203 of employees 201. Update code generator 405 generates such a constraint 515 because insert statement 503 is one of a class of expressions in the language used for the transaction description whose evaluation requires that data base system 101 execute an operation which may abort. In FIG. 5, update constraint 515 is checked before the insert operation is performed; if the constraints of 515 are not satisfied, an error message 511 is returned by update code 115; if they are satisfied, insert operation 509 is executed, as indicated at the next to the last line. If insert operation 509 is successful, the new row is added to employees 201; if it aborts, portion 116 of data base management system 113 which handles primitive operations returns an error 119.

In more detail, update constraint 515 requires that the following be true before insert 509 is executed:

the salary specified for the new row is in the allowed range;

the department number specified in the new row is the same as that of one of the departments of relation 211; and the salary specified for the new row is no more than that of the new employee's manager.

As may be seen by comparing the above constraints with the full set of constraints 301, update code generator 405 has transformed the full set of constraints into exactly those constraints which must be true before the specific transaction of adding a row to table 201 can be done.

4.3 Logical Description of the Technique

The following is a logical description of the technique of finding an update constraint in the presence of operations which may abort. The description begins with a definition of a simple transaction language which provides logical description of the transactions for which the weakest precondition is to be found. Of course, the technique is not limited to this language and may be applied with far more complex transaction languages.

4.3.1 Description of the Transaction Language

Simple updates $\mu$ are given by the grammar $$\mu ::= \text{insert}(r, a_1 = t_1, \ldots, a_i = t_i)$$
$$| \text{ delete}(r, b_1 = t_1, \ldots, b_j = t_j)$$

and transactions B are defined to be sequences (blocks) of simple updates.

$$B ::= \mu \text{ simple update}$$
$$| \mu; B \text{ sequence}$$

The abbreviations insert $(r, \vec{a} = \vec{t})$ and delete $(r, \vec{b} = \vec{t})$ will often be used. A simple update insert $(r, \vec{a} = \vec{t})$ is well-formed (with respect to the data base scheme) when $\vec{a}$ are the attributes of relation r and the terms of $\vec{t}$ contain no free record variables. If $\{\kappa_1, \ldots, \kappa_m\}$ is the key for r, then delete $(r, b_1 = t_1, \ldots, b_j = t_j)$ is well-formed when $\{\kappa_1, \ldots, \kappa_m\} \subseteq \{b_1, \ldots, b_j\}$ and the terms of $\vec{t}$ contain no free record variables. A transaction B is well-formed if all of the simple updates comprising it are well-formed.

Transactions $B(\vec{u})$, having all scheme variables among the variables $\vec{u}$, will be referred to as transaction schemes. Given terms $\vec{t} = t_1, \ldots, t_m$, an instance of such a scheme is written as $B(\vec{t})$.

Informally, insert $(r, \vec{a} = \vec{t})$ inserts the record $<\vec{a} = \vec{t}>$ into relation r and delete $(r, \vec{b} = \vec{t})$ deletes the the record $\tau$ in r with $r \cdot \vec{b} = \vec{t}$. The insert operation aborts if the insertion would result in duplicate keys, and the delete operation aborts if there is no record to be deleted. A sequence B aborts when any of its component updates aborts. The aborting semantics of the delete update is meant to model the semantics of the our current application. It is easy to modify our presentation to accommodate a delete that does not abort. In any case, we can formally define the semantics of transactions as a state-valued function $\mathcal{M} [\![B(\vec{u})]\!]\rho s$ that takes a transaction scheme $B(\vec{u})$, a state s, and a substitution $\rho$ covering the variables $\vec{u}$ arguments.

Assume we have a transaction B, formulas $\alpha$ and $\beta$, and a substitution $\rho$ that covers B, $\alpha$ and $\beta$. The formula $\beta$ is a precondition of $\alpha$ w.r.t. B and $\rho$ if for all database states s, $s, \rho \models \beta$, implies that $\mathcal{M} [\![B]\!]\rho s, \rho \models \alpha$—that is, if $\beta$ holds before the execution of B, then $\alpha$ will hold afterwards. A formula $\beta$ is called a weakest precondition of $\alpha$ w.r.t. B when $\beta$ is a precondition of $\alpha$ w.r.t. B and for all database states s, if $\mathcal{M} [\![B]\!]\rho s, \rho \models \alpha$, then $s, \rho \models \beta$. In other words, if $\beta$ is a weakest precondition of $\alpha$ w.r.t. B, then $s, \rho \models \beta$ if and only if $\mathcal{M} [\![B]\!]\rho s, \rho \models \alpha$.

4.3.2 Definition of the Weakest Precondition

The invention defines a particular weakest precondition of a formula $\alpha$ which represents with respect to a transaction B, wpc($\alpha$, B). Ordinarily, we might expect that $$\text{wpc}(\alpha, \mu; B) = \text{wpc}(\text{wpc}(\alpha, B), \mu)$$

reflecting a compositional semantics for sequencing. However, this definition is not consistent with our semantics since either $\mu$ or B may abort with the result that $\mu; B$ aborts with no change to the database. In the case of an aborting transaction the weakest precondition should simply be $\alpha$, or some equivalent formula.

This can be expressed by defining a predicate $\mathcal{N}(B)$ (pronounced B is nice) that is true if and only if B does not abort. We then define a compositional $wpc_n(\alpha, B)$ for transactions B that do not abort. A weakest precondition can then be defined as $$wpc(\alpha,B)=(\mathcal{N}(B) \wedge wpc_n(\alpha,B)) \vee (\neg \mathcal{N}(B) \wedge \alpha),$$

which says that either B is nice and $wpc_n(\alpha, B)$ holds or B will abort and leave the state unchanged.

The formulas $\mathcal{N}(B)$ and $wpc_n(\alpha,B)$ are defined as

1. $\mathcal{N}(\text{delete}(r,\vec{b}=\vec{t}))=\exists x \, \Sigma r \, x \cdot \vec{b} = \vec{t}$ 2. $\mathcal{N}(\text{insert}(r,\kappa_1=t_1, \ldots, \kappa_m=t_m, \ldots, a_i=t_i))= \forall x \Sigma r \; x \cdot \kappa_1 \neq t_1 \vee \ldots \vee x \cdot \kappa_m \neq t_m$ (where $\{\kappa_1, \ldots, \kappa_m\}$ is the key of r.)

3. $\mathcal{N}(\mu; B) = \mathcal{N}(\mu) \wedge wpc_s \mathcal{N}(b),\mu)$ where $wpc_s(\alpha,\mu)$ is a weakest precondition for simple updates, defined by recursion on the structure of $\alpha$ as 1. $wpc_s(l, \mu) = l$ 2. $wpc_s(\alpha \wedge \beta, \mu) = wpc_s(\alpha,\mu) \wedge wpc_s(\beta,\mu)$
3. $wpc_s(\alpha \vee \beta, \mu) = wpc_s(\alpha,\mu) \vee wpc_s(\beta,\mu)$
4. $wpc_s(\forall x \in r\alpha(x),\mu) =$ $$\begin{cases} wpc_s(\alpha((\vec{a}=\vec{t})),\mu \wedge \forall x \in r \, wpc_s(\alpha(x),\mu)) & \text{if } \mu = \text{insert}(r,\vec{a}=\vec{t}) \\ \forall x \in r.\vec{b}=\vec{t} \vee wpc_s(\alpha(x),\mu) & \text{if } \mu = \text{delete}(r,\vec{b}=\vec{t}) \\ \forall x \in r \, wpc_s(\alpha(x),\mu) & \text{otherwise} \end{cases}$$

5. $wpc_s(\exists x \in r\alpha(x),\mu) =$ $$\begin{cases} wpc_s(\alpha((\vec{a}=\vec{t})),\mu) \vee \exists x \in r \, wpc_s(\alpha(x),\mu) & \text{if } \mu = \text{insert}(r,\vec{a}=\vec{t}) \\ \exists x \in r.\vec{b} \neq \vec{t} \wedge wpc_s(\alpha(x),\mu) & \text{if } \mu = \text{delete}(r,\vec{b}=\vec{t}) \\ \exists x \in r \, wpc_s(\alpha(x),\mu) & \text{otherwise} \end{cases}$$

and
1. $wpc_n(\alpha,\mu) = wpc_s(\alpha,\mu)$
2. $wpc_n(\alpha,\mu; B) = wpc_s(wpc_n(\alpha,B),\mu)$

4.4 Example Industrial Application of the Technique

The technique described above has been used to maintain the data integrity of an embedded relational data base in the 5ESS switch manufactured by AT&T Corp. (5ESS is a trademark of AT&T Corp.). The data base contains information concerning telephone customers, switch configuration, and network topology. Data integrity is crucial for the proper functioning of the switch since all application programs—performing tasks such as call processing, switch maintenance, and billing—are driven from information in the database.

The 5ESS database is large and complex, containing nearly one thousand relations. The switch developers had been dealing with the integrity problem in two ways: by continually auditing the data base and by writing "safe" transactions. The auditing was done by a program which ran continually and reported errors as it found them. The code for the program was generated using a formal language for declaring static integrity constraints—a variant of the tuple relational calculus with range restrictions. These integrity constraints involved tens of thousands of integrity assertions, some very complex.

A safe transaction is one which will never result in a violation of the integrity constraints. The process of writing safe transactions for the 5ESS switch required enormous effort and was prone to error. It involved the tasks of (1) writing an initial transaction in C using a low-level interface to a database manager, (2) locating and understanding the relevant integrity constraints, (3) determining which checks had to be made to ensure data integrity, (4) encoding these checks in C and inserting them into the transaction. Over a half million lines of transaction code have been handwritten in this way.

The techniques described above have been used to partially automate the process of writing safe transactions. We eased the burden of step (1) by replacing C with a high-level transaction language, and we replaced steps (2–4) with a code generator which automatically generates code for a safe transaction from a transaction description in the transaction language.

Our transaction language is based on Qian's first-order transactions, see Xiaolei Qian, "An Axiom System for Database Transactions", *Information Processing Letters*, 1990, vol. 36, pages 183–189. The first-order transactions include the basic operations of insert, delete, and update together with control constructs for sequencing, conditionals, and a restricted form of iteration. The code generated from the transaction language and the constraints for the switch has embodied the invention described above, and has thus efficiently specified safe transactions. Use of the transaction language has guaranteed correctness, has reduced the amount of code which the switch developers must write, and has reduced the time required to define a new transaction.

Parts A, B, and C of the Appendix of the present application provide an example of the application of our techniques in the 5ESS switch. Part A of the Appendix is the constraints which apply when a row is inserted into particular one of the relations in the data base. Part B is the transaction description for the operation of inserting the row into the relation. Part C is the insertion code generated from the constraints of part A and the transaction description of part B. It should be pointed out here that the insertion code has the same general form as the code in the example of FIG. 5; the update constraints are enclosed between verify and end verify and the primitive insert operations follow the update constraints, for example insert tRloscdb in Rloscdb in the ninth line of Part C.

The $\mathcal{N}$ predicates discussed until now have had the relatively simple semantics of typical data base system insert operations. There is, however, no requirement of simplicity.

Part D of the Appendix is a complex example $\mathcal{N}$ predicate. The $\mathcal{N}$ predicate is expressed in the declarative transaction description language used in the examples for the 5ESS switch and involves checks for key conflicts in two different relations as well as for legal indices in the second relation. If the checks are passed, the predicate specifies that a row is to be located in a third relation. The $\mathcal{N}$ predicate of Appendix D can reflect the semantics of a system-level operation, as is the case with the $\mathcal{N}$ predicates for the insert and delete operations in the data base system in the 5ESS switch, or it can be semantics which are expressly defined for a statement in the transaction description language. An example of a statement in the transaction description language for which $\mathcal{N}$ semantics are expressly defined is the abort statement at the bottom of the first page of part B of the Appendix.

5 CONCLUSION

The foregoing Detailed Description has disclosed to those skilled in the art how update constraints may be employed to insure integrity in systems having operations which may abort and has shown how such update constraints may be employed in an industrial application. Use of the techniques is not limited to the data base systems disclosed herein. Rather, the techniques can be used in any application where a possible alteration is subject to constraints. For instance, the techniques might be used to verify that a modification to a computer program conforms to the requirements of the context in which it is made. It is furthermore apparent from the Detailed Description that the technique is applicable with many different ways of specifying constraints, transactions, and actual operations on the data base system.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

Appendix

A Constraints

```
/* RULE about RLosc2oap.attr_values */ for t in RLosc2oap
begin

/* validate osc_num with RLoscdb */
find == 1 osc in RLoscdb where
(osc.osc_num == t.osc_num);

/* validate oap_num with RLoapdb */
find == 1 oap in RLoapdb where
(oap.oap_num == t.oap_num);

/* no duplicates allowed */
find == 0 dup in RLosc2oap where
(dup.osc_num == t.osc_num &&
 dup.oap_num == t.oap_num &&
 dup.oap_idx != t.oap_idx);

/*
 * NOTE:
 *
 * There are no holes allowed in oap_idx
 * (i.e. if t exists with t.oap_idx == 3
 * for some t.osc_num, then t's also
 * exist for oap_idx == 0,1, and 2 with
 * this osc_num
 */
end
/* RLDSP_MSGS is to be populated from MDD so this file can be #empty-ed. */
```

```
/* RULE about RLospsparm.attr_values */ for ospsparm in RLospsparm
begin
    ospsparm.ofc_type is_in {"O"};

if(ospsparm.ofc_type == "O") then
        ospsparm.ofc_num is_in {1 thru 32};

ospsparm.ofc_oap is_in {DBYES};
    ospsparm.ofc_thresh is_in {0 thru 6};
    ospsparm.sofc_typ is_in {"O", ""};
    ospsparm.sofc_nu is_in {0 thru 32};
    ospsparm.gdport2.module is_in {0};
    ospsparm.gdport2.member is_in {0};
    ospsparm.gdport.member is_in {$GLMNPORT thru $GLMXPORT};

/* RULE about sofc_type */
    combinations_of
        (ospsparm.ofc_type, ospsparm.ofc_num,
         ospsparm.sofc_typ, ospsparm.sofc_nu)
    begin
        "O", {1 thru 32}, "O", {1 thru 32};
        "O", {1 thru 32}, "", 0;
    end /* The secondary office specified in a tuple must
     * exist as a primary office in ANOTHER tuple
     */ find == 1 TUP in RLospsparm
    where( (ospsparm.sofc_typ == TUP.ofc_type &&
            ospsparm.sofc_nu == TUP.ofc_num) &&
    (ospsparm.ofc_type != TUP.ofc_type ||
        ospsparm.ofc_num != TUP.ofc_num) )
    when_found
```

```
    begin
        TUP.sofc_typ == "" &&
        TUP.sofc_nu == 0;
    end

/*
     * For any given RLospsparm OSC-tuple, the secondary
     * office cannot be the same as the primary office
     */

!(ospsparm.sofc_typ == ospsparm.ofc_type &&
      ospsparm.sofc_nu == ospsparm.ofc_num);

/* RULE about sofc_nu */
    combinations_of
(ospsparm.ofc_type, ospsparm.ofc_num,
 ospsparm.sofc_typ, ospsparm.sofc_nu)
    begin
"0", {1 thru 32}, "0", {1 thru 32};
"0", {1 thru 32}, "", 0;
    end /* The secondary office specified in a tuple must
     * exist as a primary office in ANOTHER tuple
     */ if (ospsparm.sofc_nu != 0) then
    find == 1 TUP in RLospsparm
    where( (ospsparm.sofc_typ == TUP.ofc_type &&
            ospsparm.sofc_nu == TUP.ofc_num) &&
    (ospsparm.ofc_type != TUP.ofc_type ||
       ospsparm.ofc_num != TUP.ofc_num) )
    when_found
    begin
        TUP.sofc_typ == "" &&
        TUP.sofc_nu == 0;
```

```
        end

/*
         * For any given RLospsparm OSC-tuple, the secondary
 * office cannot be the same as the primary office
 */

!(ospsparm.sofc_typ == ospsparm.ofc_type &&
    ospsparm.sofc_nu == ospsparm.ofc_num);

/* RULE about gdport.module */
    combinations_of
(ospsparm.gdport.module, ospsparm.gdport.member)
    begin
0, 0;
            {1 thru 192}, {$GLMNPORT thru $GLMXPORT};
    end /*
     * IF the port exists it must be on an OSPS SM
     */
    if(ospsparm.gdport.module != 0) then
    begin
find == 1 modatt in RLmodatt
where(ospsparm.gdport.module == modatt.module &&
    modatt.osps_sm == DBYES);

/*
             * There can be no more than 4 OAPs per SM. Match
     * 3 tuples other than this tuple on the same SM
     * (Note: RLospsparm.gdport.module is not null
     */ find < 4 TUP in RLospsparm
        where(ospsparm.gdport.module == TUP.gdport.module &&
    ospsparm.gdport.member != TUP.gdport.member);
```

```
        /*
         * The servclass attribute of this port in RLfc_porttyp
         * must be AS_OAP.
         */ find == 1 fc_porttyp in RLfc_porttyp on ospsparm.gdport.module
          where(ospsparm.gdport == fc_porttyp.port &&
       fc_porttyp.port_indx == $GLDCH &&
       fc_porttyp.servclass == AS_OAP);
    end /* RULE about evnt_rpt */
    if(ospsparm.evnt_rpt == DBYES) then
    begin
        ospsparm.sofc_typ != "" &&
        ospsparm.sofc_nu != 0;
    end /* RULE about ofc_dcq, ofc_dst, ofc_dpos ofc_dop, ofc_prf1,
 * ofc_prf2, ofc_prf3, ofc_prf4, ofc_prf5, ofc_wnt1tr24,
 * ofc_wnt2tr24, ofc_wnt3tr24, ofc_wnt4tr24, ofc_wnt5tr24,
 * ofc_prfop
 * ofc_pm1 must be DBYES
 * ofc_pm2 must be DBYES
 * ofc_pm3 must be DBYES
 * ofc_pm4 must be DBYES
 * ofc_pm5 must be DBNO
 * If ofc_pmop is DBNO, ofc_prfop must be DBNO
 * ofc_pm1tr24 must be DBNO
 * ofc_pm2tr24 must be DBNO
 * ofc_pm3tr24 must be DBNO
 * ofc_pm4tr24 must be DBNO
 * ofc_pm5tr24 must be DBNO
 */
    if(ospsparm.ofc_oap == DBNO) then
    begin
```

```
        ospsparm.ofc_dcq == DBNO;
        ospsparm.ofc_dst == DBNO;
        ospsparm.ofc_dpos == DBNO;
ospsparm.ofc_dop == DBNO;
    end
    ospsparm.ofc_pm1 == DBYES;
    ospsparm.ofc_prf1 == DBYES;
    ospsparm.ofc_pm2 == DBYES;
    ospsparm.ofc_prf2 == DBYES;
    ospsparm.ofc_pm3 == DBYES;
    ospsparm.ofc_prf3 == DBYES;
    ospsparm.ofc_pm4 == DBYES;
    ospsparm.ofc_prf4 == DBYES;
    ospsparm.ofc_pm5 == DBNO;
    ospsparm.ofc_prf5 == DBNO;
    ospsparm.ofc_pm1tr24 == DBNO;
    ospsparm.ofc_wnt1tr24 == DBNO;
    ospsparm.ofc_pm2tr24 == DBNO;
    ospsparm.ofc_wnt2tr24 == DBNO;
    ospsparm.ofc_pm3tr24 == DBNO;
    ospsparm.ofc_wnt3tr24 == DBNO;
    ospsparm.ofc_pm4tr24 == DBNO;
    ospsparm.ofc_wnt4tr24 == DBNO;
    ospsparm.ofc_pm5tr24 == DBNO;
    ospsparm.ofc_wnt5tr24 == DBNO;
    if(ospsparm.ofc_pmop == DBNO) then
    begin
        ospsparm.ofc_prfop == DBNO;
    end
end /* RULE about RLoscdb.attr_values */ for oscdb in RLoscdb
begin
    oscdb.osc_num is_in {1 thru 128};
    oscdb.mon_ndcator is_in {DBYES,DBNO};
``` end

/* RULE about RLoapdb.attr_values */ for oapdb in RLoapdb
begin
    oapdb.oap_num is_in {1 thru 8};
    oapdb.port is_in {$GLMNPORT thru $GLMXPORT};

/* RULE about gdport.module */
    combinations_of
(oapdb.module, oapdb.port)
    begin
        {1 thru 192}, {$GLMNPORT thru $GLMXPORT};

end /* combinations_of (*oapdb.module...) */

/* The port must be on an OSPS SM */
    find == 1 modatt in RLmodatt
    where(oapdb.module == modatt.module &&
modatt.osps_sm == DBYES);

/* There can be no more than 4 OAPs per SM */
    find < 4 TUP in RLoapdb
    where(oapdb.module == TUP.module &&
oapdb.port    != TUP.port);

/*
     * The servclass attribute of this port in RLfc_porttyp
     * must be AS_OAP.
     */ find == 1 fc_porttyp in RLfc_porttyp on oapdb.module
    where(oapdb.port           == fc_porttyp.port.member &&
oapdb.module           == fc_porttyp.port.module &&
fc_porttyp.servclass == AS_OAP);

```
end /* for oapdb in RLoapdb */
```

B   The INSERT Transaction Description insert-rules:

/****** Insert Case ******/

```
    insert oscdb in RLoscdb
    begin
oscdb.osc_num = new_view.osc_num;
oscdb.mon_ndcator = new_view.mon_ndcator;
    end for i in {1 thru MAXLIST}
    begin
    /* check if oap_num has been entered on the view */
    if (new_view.nulls.oap_num[i] != NWZ) then
    begin
/* check if the oap_num entered is valid */
find oapdb in RLoapdb
where (oapdb.oap_num == new_view.oap_num[i])
when_found
begin
insert osc2oap in RLosc2oap
begin
osc2oap.osc_num = new_view.osc_num;
osc2oap.oap_idx = i;
osc2oap.oap_num = new_view.oap_num[i];
osc2oap.evnt = new_view.evnt[i];
end
end
else
begin
abort(CstmErr);
/* RCERR101; */
/* INPUT DATA ERROR */
/* OAP NUM entered does not exist (OSOAP). */
end
```

```
        end
    end
```

C  Generated Code for INSERT

```
insert-rules:
begin
    begin
        verify
        new_view.osc_num>=1;
        new_view.osc_num<=128;
        new_view.mon_ndcator==DBNO || new_view.mon_ndcator==DBYES;
        endverify
        insert tRLoscdb in RLoscdb
        begin
            tRLoscdb.osc_num = new_view.osc_num;
            tRLoscdb.mon_ndcator = new_view.mon_ndcator;
        end
    end
    begin
        verify
        for t in RLosc2oap
        begin
            for i in {1 thru MAXLIST}
            where (NWZ!=new_view.nulls.oap_num[i])
            begin
                let g0() =
                    for oapdb in RLoapdb
                    begin oapdb.oap_num!=new_view.oap_num[i]; end
                if (i!=t.oap_idx) then
                    new_view.osc_num!=t.osc_num ||
                    t.oap_num!=new_view.oap_num[i] ||
                    g0();
            end
        end
```

```
endverify
for i in {1 thru MAXLIST}
begin
    if (NWZ!=new_view.nulls.oap_num[i]) then
    begin
        let g1() =
            find > 0 oapdb in RLoapdb
            where (oapdb.oap_num==new_view.oap_num[i]);
        verify
        if (g1()) then
        begin
            for i_ in {1 thru MAXLIST}
            where (NWZ!=new_view.nulls.oap_num[i_])
            begin
                if (new_view.oap_num[i]==new_view.oap_num[i_]) then
                    i==i_;
            end
            for dup in RLosc2oap
            where (dup.osc_num==new_view.osc_num &&
                   dup.oap_num==new_view.oap_num[i])
            begin i==dup.oap_idx; end
        end
        endverify
        find oapdb in RLoapdb
        where (oapdb.oap_num==new_view.oap_num[i])
        when_found
            insert tRLosc2oap in RLosc2oap
            begin
                tRLosc2oap.oap_num = new_view.oap_num[i];
                tRLosc2oap.osc_num = new_view.osc_num;
                tRLosc2oap.oap_idx = i;
                tRLosc2oap.evnt = new_view.evnt[i];
            end
        else
            abort(CstmErr);
    end
end
```

```
        end
end
```

D  Example NICE Predicate

```
    /* no key conflict */
    for oscdb in RLoscdb
    begin
oscdb.osc_num != new_view.osc_num;
    end
    for i in {1 thru MAXLIST}
    begin
        if (new_view.nulls.oap_num[i] != NWZ) then
begin
      /* no key conflict */
      for osc2oap in RLosc2oap
       begin
     osc2oap.osc_num != new_view.osc_num ||
         osc2oap.oap_idx != i;
       end
      /* abort branch is not taken */
      find > 0 oapdb in RLoapdb
      where (oapdb.oap_num == new_view.oap_num[i])
end
    end
```

What is claimed is:

1. Apparatus for generating code for a transaction on a set of data, the transaction being subject to constraints and the apparatus comprising:

a transaction description which describes operations performed in the transaction, the operations including at least one operation which may abort without affecting the set of data;

a constraint specification which specifies the constraints to which the transaction is subject; and code generating means responsive to the transaction description and the constraint specification for generating the code, the code generating means including means for generating code for an update constraint which indicates whether the constraints would be satisfied if the transaction could not abort and which is executed prior to any operation which may abort.

2. The apparatus set forth in claim 1 wherein:

the system in which the code is executed has an application level and a system level;

the code for the update constraint runs at the application level; and the operation aborts at the system level.

3. The apparatus set forth in either claim 1 or 2 wherein:

the means for generating code generates code for an update constraint which is a weakest precondition.

4. The apparatus set forth in either claim 1 or 2 wherein:

the transaction is an update transaction which alters the set of data.

5. The apparatus set forth in either claim 1 or 2 wherein:

the apparatus is implemented in a data base system; and the transaction is an update transaction of the data base system.

6. A method of making apparatus for performing a transaction on a data set, the transaction being subject to constraints and involving an operation which may abort, the method comprising the steps of:

computing from the constraints and a description of the transaction which describes Operations of the transaction an update constraint which indicates whether the constraints would be satisfied if the transaction could not abort; and generating code which is executed during the transaction and which determines whether the update constraint is satisfied.

7. The method set forth in claim 6 wherein:

the operation which may abort aborts at a system level; and the step of generating code generates code which is executed at the user level.

8. The method set forth in either claim 6 or claim 7 wherein:

the step of generating code generates code for an update constraint which is a weakest precondition.

9. A method of performing a transaction on a set of data which alters the set of data, the transaction being subject to constraints, the method including the step of altering the data, and the step of altering the data involving an operation which may abort, the method having the improvement comprising the step of:

prior to performing the step of altering the set of data, testing an update constraint which, when satisfied, indicates whether the constraints would be satisfied if the transaction could not abort, and not altering the set of data if the update constraint is not satisfied.

10. A data base system for performing transactions on a set of data, the transactions being subject to constraints and the data base system including means for updating data, the means for updating data performing an operation which may abort without affecting the set of data, and the database system having the improvement comprising:

means for ensuring integrity of the set of data by testing an update constraint which, when satisfied, indicates that the constraints would be satisfied if the operation could not abort and indicating to the means for updating whether the update constraint is satisfied, the means for updating altering the set of data only if the update constraint is satisfied.

* * * * *